(12) United States Patent
Kurian et al.

(10) Patent No.: US 11,443,287 B2
(45) Date of Patent: Sep. 13, 2022

(54) USING DISTRIBUTED DATABASES FOR NETWORK REGRESSION ANALYSIS

(71) Applicant: Bank of America Corporation, Charlotte, NC (US)

(72) Inventors: Manu Kurian, Dallas, TX (US); Sonia Verma, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 590 days.

(21) Appl. No.: 16/212,286

(22) Filed: Dec. 6, 2018

(65) Prior Publication Data

US 2020/0184428 A1 Jun. 11, 2020

(51) Int. Cl.
| G06Q 10/00 | (2012.01) |
| G06F 16/21 | (2019.01) |
| G06F 16/248 | (2019.01) |
| G06F 16/27 | (2019.01) |
| G06F 16/2457 | (2019.01) |

(52) U.S. Cl.
CPC .......... *G06Q 10/20* (2013.01); *G06F 16/219* (2019.01); *G06F 16/248* (2019.01); *G06F 16/24578* (2019.01); *G06F 16/27* (2019.01)

(58) Field of Classification Search
CPC . G06Q 10/20; G06F 16/219; G06F 16/24578; G06F 16/248; G06F 16/27
See application file for complete search history.

(56) References Cited

U.S. PATENT DOCUMENTS

| 7,689,250 | B2 | 3/2010 | Kravitz et al. |
| 7,895,565 | B1 | 2/2011 | Hudgons et al. |
| 8,583,556 | B2 | 11/2013 | Dunkeld et al. |
| 9,235,854 | B1* | 1/2016 | O'Donnell .......... H04L 41/5096 |
| 9,310,790 | B2 | 4/2016 | Krishnaswamy et al. |
| 9,582,781 | B1 | 2/2017 | Kearns et al. |
| 9,699,049 | B2 | 7/2017 | Gupta et al. |
| 10,013,303 | B2 | 7/2018 | Pallath et al. |
| 2012/0102363 | A1* | 4/2012 | Milojicic .............. G06F 11/079 |
| | | | 714/E11.178 |
| 2015/0074095 | A1* | 3/2015 | Enders .................... G06F 40/30 |
| | | | 707/728 |
| 2016/0092808 | A1* | 3/2016 | Cheng ................ G06Q 10/0639 |
| | | | 705/7.28 |
| 2016/0125365 | A1* | 5/2016 | Fix ......................... G06Q 10/20 |
| | | | 705/305 |
| 2016/0125751 | A1* | 5/2016 | Barker ................... G06N 20/00 |
| | | | 434/322 |

(Continued)

*Primary Examiner* — Jan P Mincarelli
(74) *Attorney, Agent, or Firm* — Banner & Witcoff, Ltd.

(57) ABSTRACT

A computing platform may communicate with a device agent to receive digital system maintenance reporting, which may include information regarding steps taken to resolve issues of a digital system during a troubleshooting process. The computing platform may analyze the steps taken, and determine whether the steps resolved the troubleshooting. The computing platform may filter ineffective steps, and store steps associated with successful solutions in one or more distributed databases. The computing platform may receive information identifying a problem faced by a different system. The computing platform may analyze the distributed database to identify similar steps that successfully resolved the problem in the past, and mitigate the problem using the similar successful steps.

20 Claims, 13 Drawing Sheets

(56) References Cited

U.S. PATENT DOCUMENTS

| | | |
|---|---|---|
| 2016/0291552 A1 | 10/2016 | Pal et al. |
| 2017/0011111 A1 | 1/2017 | Pallath et al. |
| 2017/0242860 A1* | 8/2017 | Souche ............. G06F 16/24578 |
| 2017/0364818 A1 | 12/2017 | Wu et al. |
| 2018/0227293 A1 | 8/2018 | Uhr et al. |
| 2019/0347282 A1* | 11/2019 | Cai ........................ G06F 3/0482 |
| 2020/0019893 A1* | 1/2020 | Lu ........................... G06N 20/00 |
| 2020/0118675 A1* | 4/2020 | Schriver ................ G16H 40/40 |

* cited by examiner

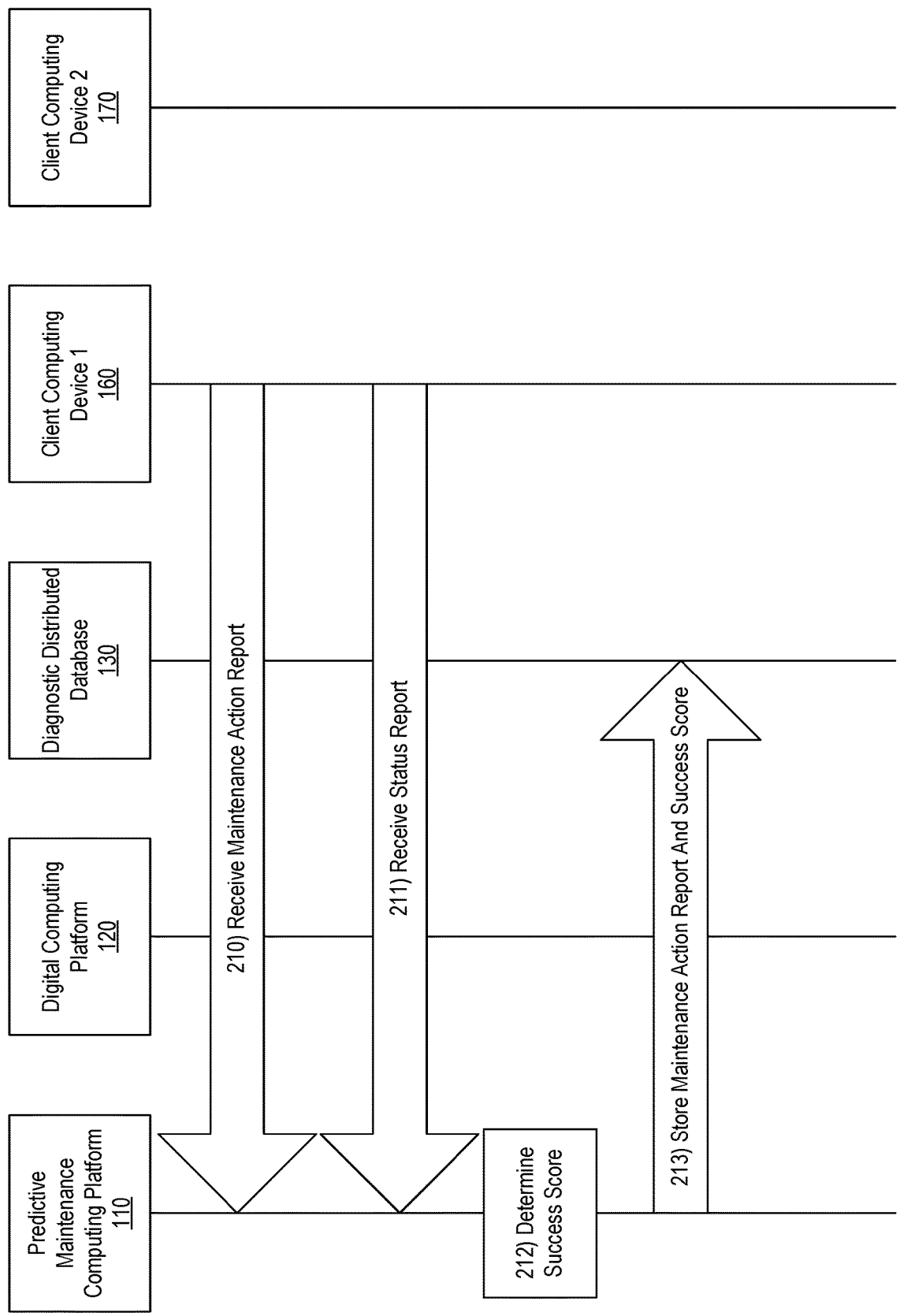

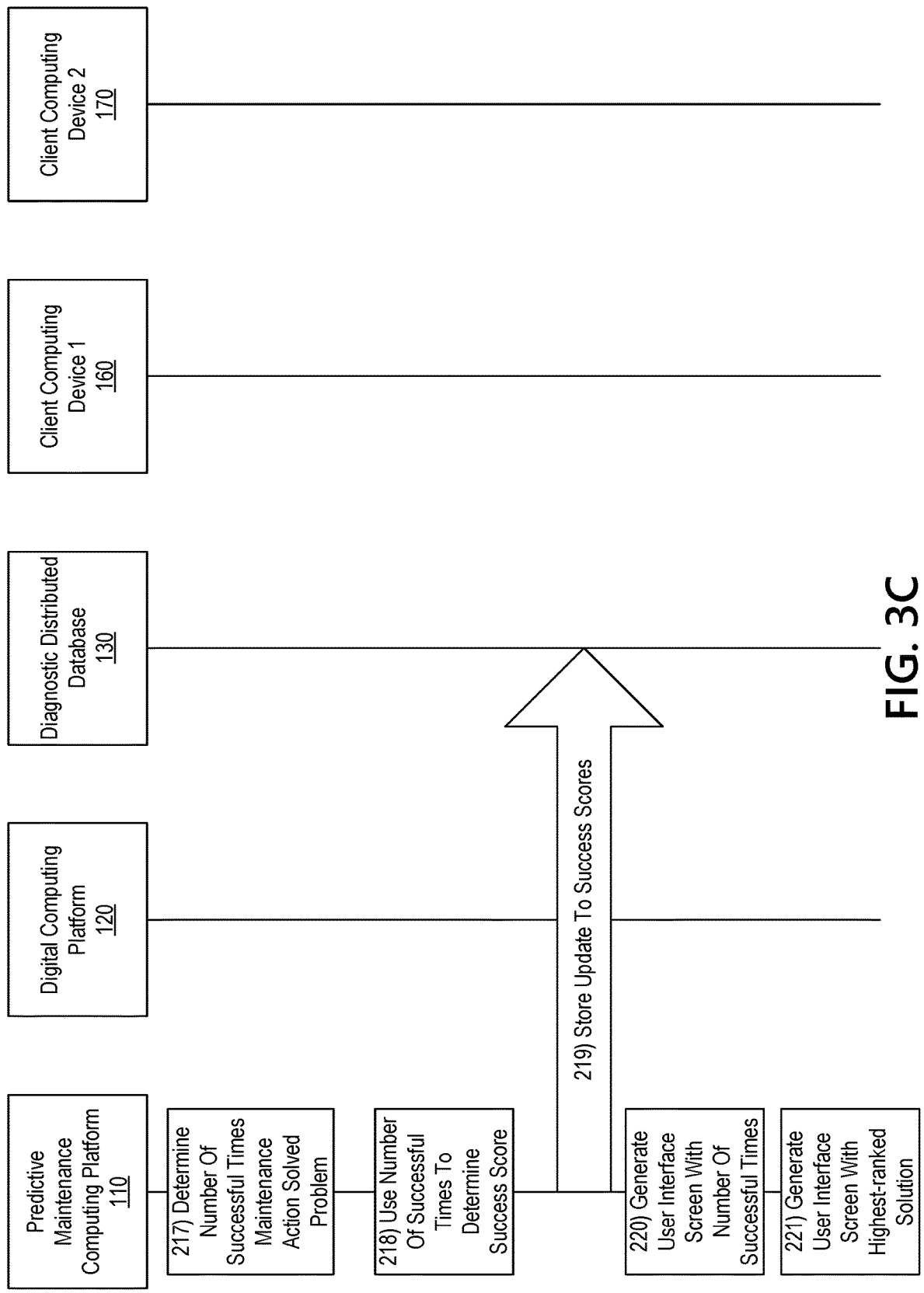

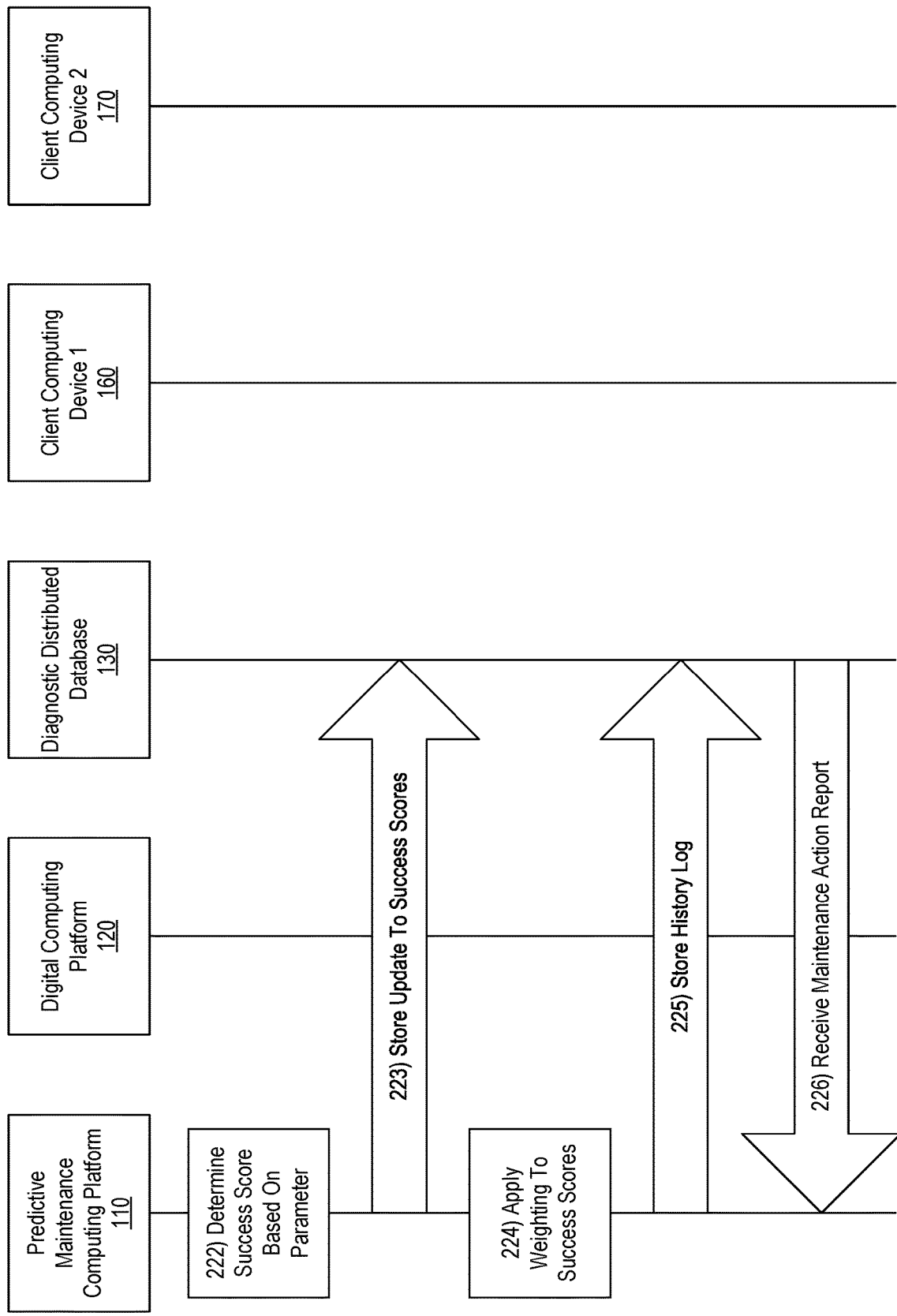

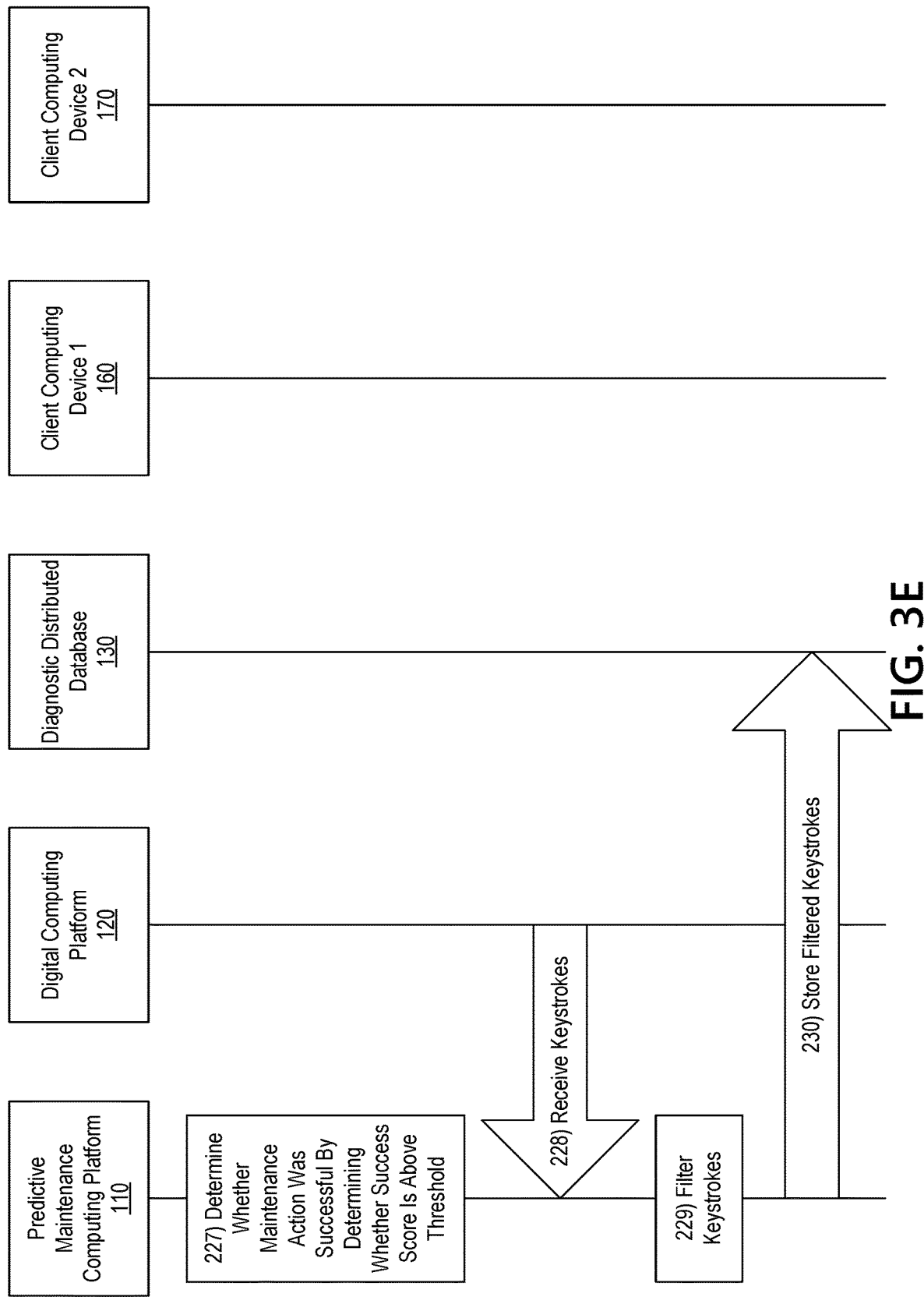

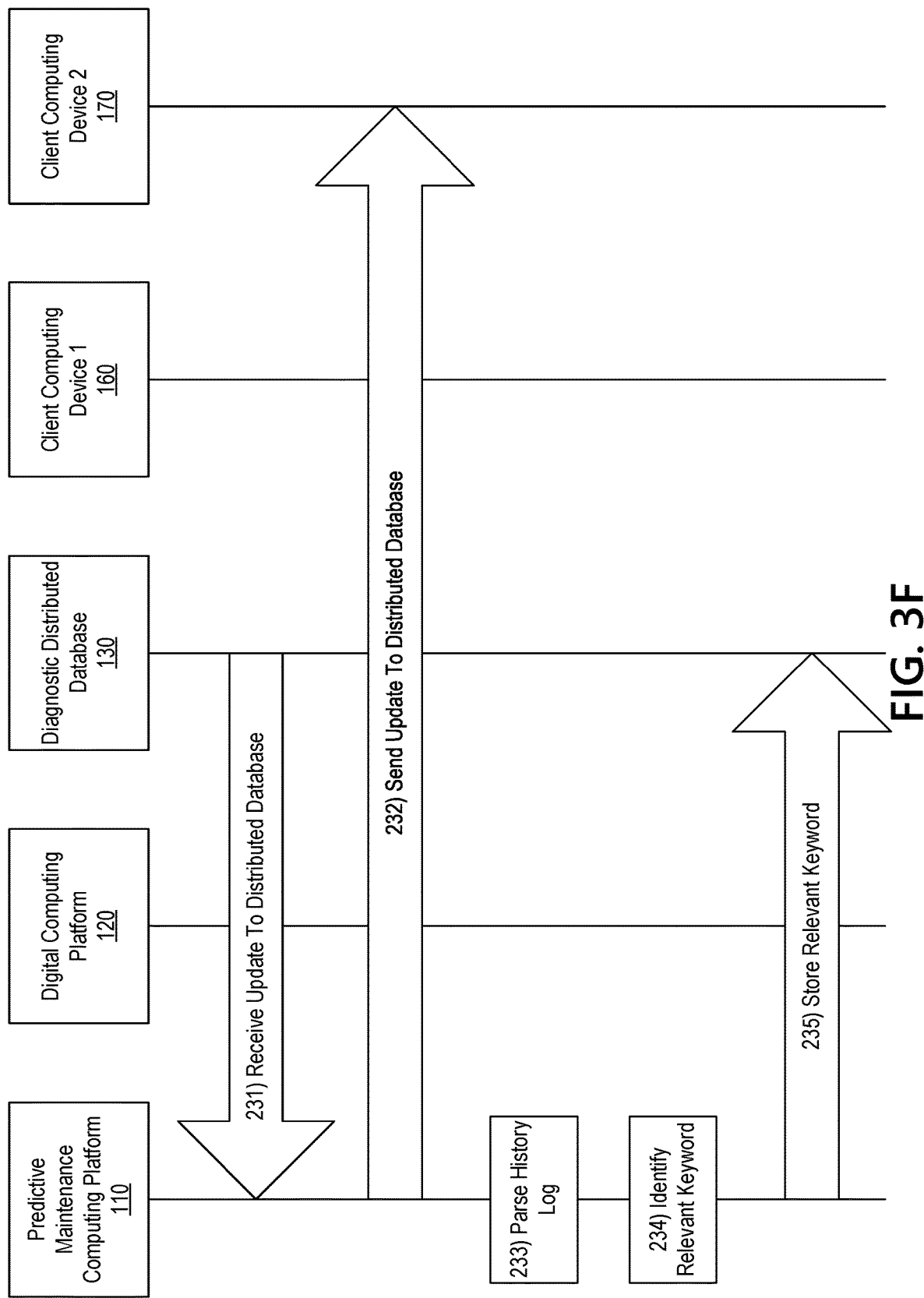

USING DISTRIBUTED DATABASES FOR NETWORK REGRESSION ANALYSIS

FIELD

Aspects of the disclosure relate to computer hardware and software. In particular, one or more aspects of the disclosure generally relate to computer hardware and software for using distributed databases for network regression analysis.

BACKGROUND

Businesses, organizations, and consumers increasingly deal with vast amounts of digital information, and therefore maintaining the systems that provide access to that information is increasingly important. Companies and individuals have various methods of maintaining digital systems, and often go through multiple rounds of decision making when determining problems and solutions to those problems. To make the troubleshooting process more effective and efficient, there will always be a need for an increasingly easy and convenient way to determine and replicate past successful actions for identifying and solving problems of digital systems.

SUMMARY

Aspects of the disclosure provide effective, efficient, scalable, and convenient technical solutions that address and overcome the technical problems associated with using distributed databases for network regression analysis. Additional aspects of the disclosure relate to various systems and techniques that provide effective, efficient, scalable, and convenient ways of using distributed databases for efficiently identifying, analyzing, and mitigating system disruptions of digital computing platforms.

In accordance with one or more embodiments, a computing platform having at least one processor, a memory, and a communication interface may receive a maintenance action report associated with a maintenance action performed on a first computing platform; receive a history log associated with at least one historical maintenance action performed on the first computing platform; receive a status report of a current operating status of the first computing platform; determine, based on the status report of the current operating status of the first computing platform, a success score for the maintenance action performed on the first computing platform; store, in the history log associated with the at least one historical maintenance action performed on the first computing platform: the maintenance action report associated with the maintenance action performed on the first computing platform, and the success score for the maintenance action performed on the first computing platform; receive a request for a suggested solution to a new problem with a second computing platform that is different from the first computing platform; identify, from the history log associated with the first computing platform, at least one potential solution associated with the new problem with the second computing platform; determine, from among the at least one potential solution associated with the new problem with the second computing platform, a highest-ranked solution of the at least one potential solution associated with the new problem with the second computing platform; and send, in response to the request for the suggested solution to the new problem with the second computing platform, a command configured to cause a maintenance action to be performed on the second computing platform, the maintenance action based on the highest-ranked solution of the at least one potential solution associated with the new problem with the second computing platform.

In one or more embodiments, the computing platform may receive a maintenance action report associated with a maintenance action performed on the second computing platform, the maintenance action based on the command configured to cause the maintenance action to be performed on the second computing platform, the maintenance action performed on the second computing platform associated with the highest-ranked solution of the at least one potential solution associated with the new problem with the second computing platform; receive a status report of a current operating status of the second computing platform; determine, based on the status report of the current operating status of the second computing platform, a success score for the maintenance action performed on the second computing platform; and store, in a history log associated with at least one historical maintenance action performed on the second computing platform: the maintenance action report associated with the maintenance action performed on the second computing platform, and the success score for the maintenance action performed on the second computing platform.

In one or more embodiments, the computing platform may determine whether the maintenance action performed on the first computing platform and the maintenance action performed on the second computing platform are both associated with a similar potential problem; in a case that the maintenance action performed on the first computing platform and the maintenance action performed on the second computing platform are both associated with a similar potential problem, compare the success score for the maintenance action performed on the first computing platform and the success score for the maintenance action performed on the second computing platform; and store an update to at least one of the success score for the maintenance action performed on the first computing platform and the success score for the maintenance action performed on the second computing platform, the update based on comparing the success score for the maintenance action performed on the first computing platform and the success score for the maintenance action performed on the second computing platform.

In one or more embodiments, the computing platform may store, in a distributed database, the update to the at least one of the success score for the maintenance action performed on the first computing platform and the success score for the maintenance action performed on the second computing platform.

In one or more embodiments, the computing platform may determine, from the history log associated with the at least one historical maintenance action performed on the first computing platform, a number of successful times the maintenance action performed on the first computing platform solved a same problem with the first computing platform; and use the determined number of successful times the maintenance action performed on the first computing platform solved the same problem with the first computing platform as part of determining the success score for the maintenance action performed on the first computing platform.

In one or more embodiments, the computing platform may generate, for display, a user interface screen that comprises the number of successful times the maintenance action performed on the first computing platform solved the same problem with the first computing platform.

In one or more embodiments, the computing platform may generate, for display, a user interface screen that comprises the highest-ranked solution of the at least one potential solution associated with the new problem with the second computing platform.

In one or more embodiments, the computing platform may determine, based on at least one parameter, the success score for the maintenance action performed on the first computing platform.

In one or more embodiments, the computing platform may apply a respective weighting to a respective success score associated with each of the at least one potential solution associated with the new problem with the second computing platform, as part of determining, from among the at least one potential solution associated with the new problem with the second computing platform, the highest-ranked solution of the at least one potential solution associated with the new problem with the second computing platform.

In one or more embodiments, the computing platform may apply a non-zero weighting to at least one parameter of the success score for the maintenance action performed on the first computing platform if a measure of the at least one parameter of the success score for the maintenance action performed on the first computing platform is above a weighting threshold, and apply a zero weighting to the at least one parameter of the success score for the maintenance action performed on the first computing platform if the measure of the at least one parameter of the success score for the maintenance action performed on the first computing platform is below the weighting threshold.

In one or more embodiments, the computing platform may store, in a distributed database, the history log associated with the at least one historical maintenance action performed on the first computing platform.

In one or more embodiments, the computing platform may receive, from a distributed database, the maintenance action report associated with the maintenance action performed on the first computing platform.

In one or more embodiments, the computing platform may receive, from a distributed database, the history log associated with the at least one historical maintenance action performed on the first computing platform.

In one or more embodiments, the computing platform may determine, based on the success score for the maintenance action performed on the first computing platform, whether the maintenance action performed on the first computing platform was a successful solution by determining whether the success score for the maintenance action performed on the first computing platform is above a success threshold.

In one or more embodiments, the computing platform may receive a plurality of keystrokes entered by a user as part of performing the maintenance action performed on the first computing platform; and filter the plurality of keystrokes to remove at least one irrelevant keystroke that is irrelevant to the successful solution.

In one or more embodiments, the computing platform may store the filtered plurality of keystrokes in a distributed database.

In one or more embodiments, the computing platform may receive an updated version of the distributed database; and send the updated version of the distributed database to a different computing device.

In one or more embodiments, the computing platform may parse the history log associated with the at least one historical maintenance action performed on the first computing platform; identify, from parsing the history log associated with the at least one historical maintenance action performed on the first computing platform, a relevant keyword associated with the maintenance action performed on the first computing platform; and store, in a distributed database with the maintenance action report associated with the maintenance action performed on the first computing platform and the success score for the maintenance action performed on the first computing platform, the relevant keyword associated with the maintenance action performed on the first computing platform.

In accordance with one or more embodiments, a method may include, at a computing platform having at least one processor, a memory, and a communication interface, receive a maintenance action report associated with a maintenance action performed on a first computing platform; receive a history log associated with at least one historical maintenance action performed on the first computing platform; receive a status report of a current operating status of the first computing platform; determine, based on the status report of the current operating status of the first computing platform, a success score for the maintenance action performed on the first computing platform; store, in the history log associated with the at least one historical maintenance action performed on the first computing platform: the maintenance action report associated with the maintenance action performed on the first computing platform, and the success score for the maintenance action performed on the first computing platform; receive a request for a suggested solution to a new problem with a second computing platform that is different from the first computing platform; identify, from the history log associated with the first computing platform, at least one potential solution associated with the new problem with the second computing platform; determine, from among the at least one potential solution associated with the new problem with the second computing platform, a highest-ranked solution of the at least one potential solution associated with the new problem with the second computing platform; and send, in response to the request for the suggested solution to the new problem with the second computing platform, a command configured to cause a maintenance action to be performed on the second computing platform, the maintenance action based on the highest-ranked solution of the at least one potential solution associated with the new problem with the second computing platform.

In accordance with one or more embodiments, one or more non-transitory computer-readable media may store computer-readable instructions that, when executed by a computing platform having at least one processor, a memory, and a communication interface, may cause the computing platform to receive a maintenance action report associated with a maintenance action performed on a first computing platform; receive a history log associated with at least one historical maintenance action performed on the first computing platform; receive a status report of a current operating status of the first computing platform; determine, based on the status report of the current operating status of the first computing platform, a success score for the maintenance action performed on the first computing platform; store, in the history log associated with the at least one historical maintenance action performed on the first computing platform: the maintenance action report associated with the maintenance action performed on the first computing platform, and the success score for the maintenance action performed on the first computing platform; receive a request for a suggested solution to a new problem with a second computing platform that is different from the first computing platform; identify, from the history log associated with the first computing platform, at least one potential solution associated with the new problem with the second computing platform; determine, from among the at least one potential solution associated with the new problem with the second computing platform, a highest-ranked solution of the at least one potential solution associated with the new problem with the second computing platform; and send, in response to the request for the suggested solution to the new problem with the second computing platform, a command configured to cause a maintenance action to be performed on the second computing platform, the maintenance action based on the highest-ranked solution of the at least one potential solution associated with the new problem with the second computing platform.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 depicts an illustrative block diagram of distributed-database-based management of continuous operations in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
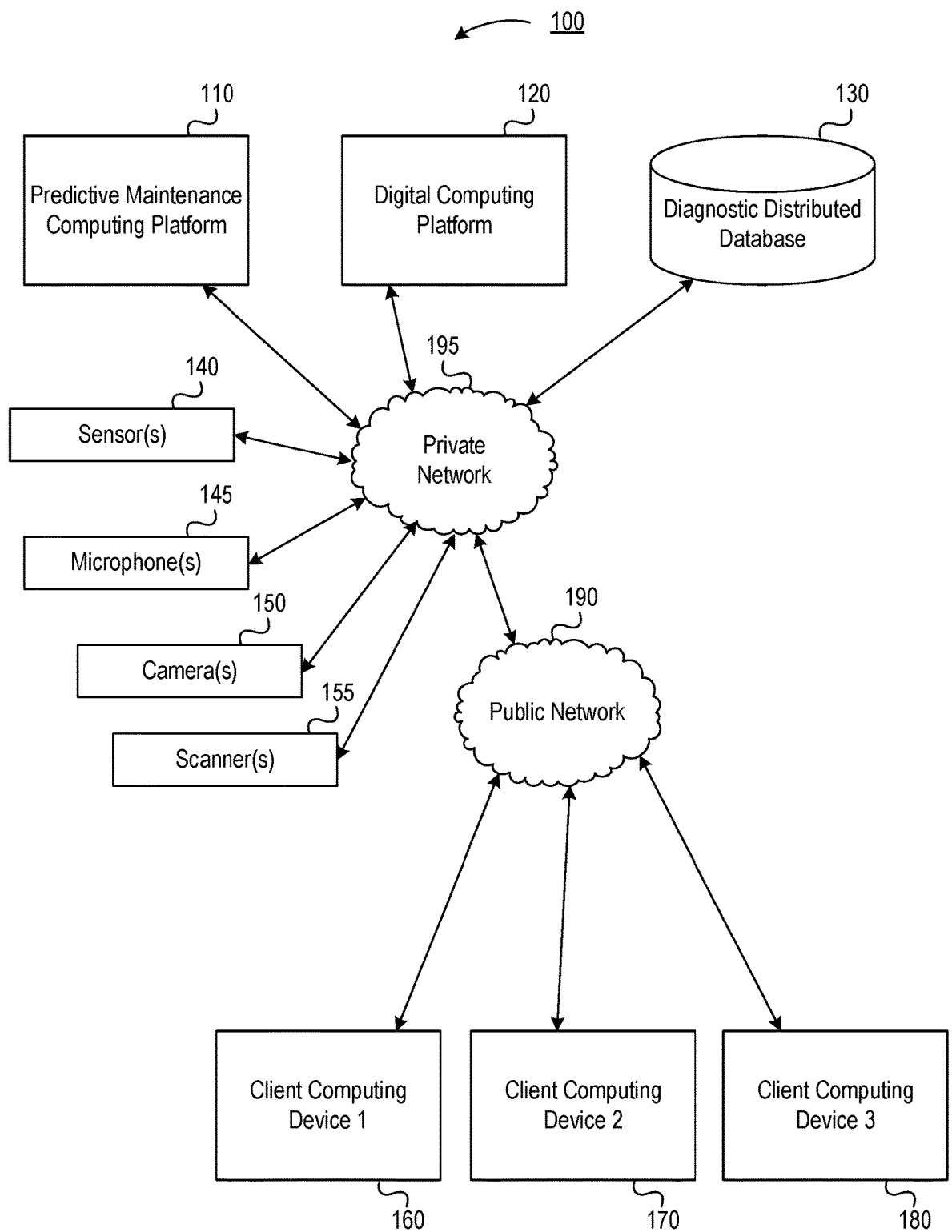
FIGS. 1A and 1B depict an illustrative computing environment for using distributed databases for network regression analysis in accordance with one or more example embodiments.
Figure 1B:
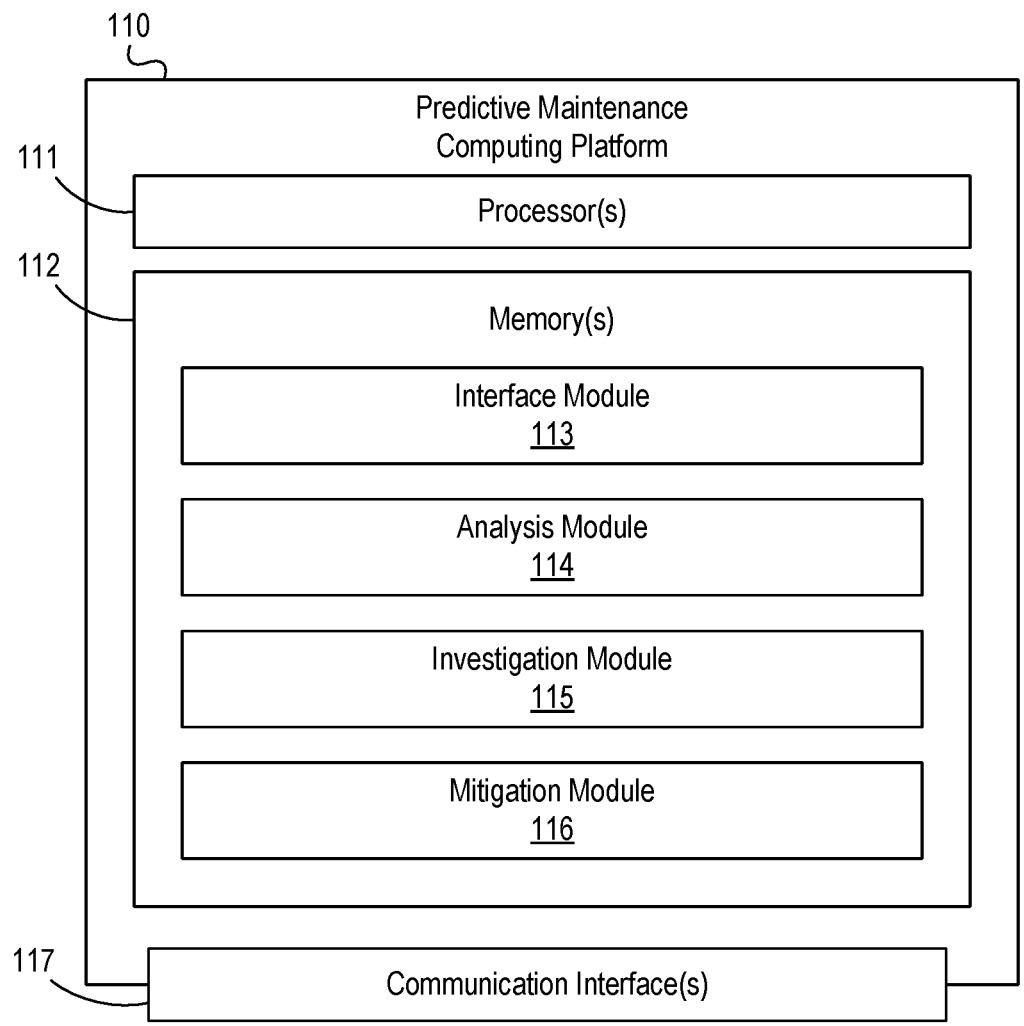

FIGS. 1A and 1B depict an illustrative computing environment for using distributed databases for network regression analysis in accordance with one or more example embodiments. Referring to FIG. 1A, computing environment 100 may include one or more computing devices. For example, computing environment 100 may include a predictive maintenance computing platform 110, a digital computing platform 120, a diagnostic distributed database 130, a first client computing device 160, a second client computing device 170, and a third client computing device 180.

Predictive maintenance computing platform 110 may be configured to receive information (e.g., problem identification information, analysis collection, troubleshooting data, maintenance action reports, history logs). Predictive maintenance computing platform 110 may analyze the collected data, identify relevant data, correlate the relevant data with associated system problems, index the relevant data, and store the relevant data in an accessible manner. For example, predictive maintenance computing platform 110 may store the relevant data in a distributed database, such as diagnostic distributed database 130.

Digital computing platform 120 may be configured to provide services for tracking, filtering, identifying, and sending maintenance actions, troubleshooting actions, and the like to predictive maintenance computing platform 110. For example, digital computing platform 120 may be a computing system that a user uses to perform maintenance on a different system or platform (e.g., server, website, corporate intranet). Digital computing platform 120 may include a module, an agent, or other program that assists the user in maintaining, troubleshooting, upgrading, and otherwise working to ensure the smooth operation of the different system or platform. The module, agent, or other program may run in the background or foreground, and may collect information regarding steps the user takes in maintaining, troubleshooting, upgrading, and otherwise working on the different system or platform.

Diagnostic distributed database 130 may be one or more distributed databases configured to store information regarding troubleshooting, maintenance, and other steps taken to mitigate problems with servers, systems, platforms, sites, or the like. Diagnostic distributed database 130 may include, for example, one or more blockchains. Diagnostic distributed database 130 may be a private blockchain with a company with shared access to one or more vendors that the company works with. This may allow for collaboration or partnership between the company and the vendor. The vendor may have its own blockchain that stores information about a product, while the company may have its own blockchain that stores information about troubleshooting the product or one or more systems using or implementing the product. A matrix may exist linking the vendor blockchain and the company blockchain.

In another example, an organization may have a relationship with a first vendor and a second company. The first vendor and the second company may have a relationship with each other. The organization may have one or more specific data assets that are stored in diagnostic distributed database 130. One or more of the specific data assets that are stored in diagnostic distributed database 130 may be linked to a pointer. The first vendor may, in one or more embodiments, provide transparent troubleshooting across its clients. The first vendor's troubleshooting information may be stored in a first distributed database, or a first part of diagnostic distributed database 130. The organization may maintain a customization of the first vendor's product, the customization being specific to the organization. The organization may maintain troubleshooting for the customization in a second distributed database, or a second part of the diagnostic distributed database 130. For example, the first part of the diagnostic distributed database 130 might be separate from the second part of the diagnostic distributed database 130. A party might only have access rights to the first part of the diagnostic distributed database 130, might only have access rights to the second part of the diagnostic distributed database 130, or might have access rights to both the first part of the diagnostic distributed database 130 and the second part of the diagnostic distributed database 130.

Client computing device 160 may be configured to be used by a first customer of an organization, such as a financial institution. In some instances, client computing device 160 may, for example, be registered with the organization and/or one or more computer systems in computing environment 100, such that the organization and/or the one or more computer systems maintain one or more records linking client computing device 160 to the first customer of the organization, as illustrated in greater detail below. Client computing device 170 may be configured to be used by a second customer of the organization (who may, e.g., be different from the first customer of the organization). In some instances, client computing device 170 may, for example, be registered with the organization and/or one or more computer systems in computing environment 100, such that the organization and/or the one or more computer systems maintain one or more records linking client computing device 170 to the second customer of the organization, as illustrated in greater detail below. Client computing device 180 may be configured to be used by a third customer of the organization (who may, e.g., be different from the first customer of the organization and the second customer of the organization). In some instances, client computing device 180 may, for example, be registered with the organization and/or one or more computer systems in computing environment 100, such that the organization and/or the one or more computer systems maintain one or more records linking client computing device 180 to the third customer of the organization, as illustrated in greater detail below.

In one or more arrangements, predictive maintenance computing platform 110, digital computing platform 120, diagnostic distributed database 130, client computing device 160, client computing device 170, and client computing device 180 may be any type of computing device capable of receiving a user interface, receiving input via the user interface, and communicating the received input to one or more other computing devices. For example, digital computing platform 120, diagnostic distributed database 130, client computing device 160, client computing device 170, and client computing device 180 may, in some instances, be and/or include server computers, server blades, desktop computers, laptop computers, tablet computers, smart phones, or the like that may include one or more processors, memories, communication interfaces, storage devices, and/or other components. As noted above, and as illustrated in greater detail below, any and/or all of digital computing platform 120, diagnostic distributed database 130, client computing device 160, client computing device 170, and client computing device 180 may, in some instances, be special-purpose computing devices configured to perform specific functions.

Computing environment 100 also may include one or more devices for gathering information for use by one or more of predictive maintenance computing platform 110, digital computing platform 120, and diagnostic distributed database 130. For example, computing environment 100 may include one or more sensor(s) 140, one or more microphone(s) 145, one or more camera(s) 150, one or more scanner(s) 155, and/or additional information-gathering devices (e.g., hardware or software). Computing environment 100 may include one or more processors, microprocessors, computers, microcomputers, circuits, and/or other hardware for gathering, storing, processing, converting, or otherwise enabling one or more sensor(s) 140, one or more microphone(s) 145, one or more camera(s) 150, one or more scanner(s) 155, and/or additional information-gathering devices in computing environment 100.

Computing environment 100 also may include one or more networks, which may interconnect one or more of predictive maintenance computing platform 110, digital computing platform 120, diagnostic distributed database 130, one or more sensor(s) 140, one or more microphone(s) 145, one or more camera(s) 150, one or more scanner(s) 155, client computing device 160, client computing device 170, and client computing device 180. For example, computing environment 100 may include public network 190 and private network 195. Private network 195 and/or public network 190 may include one or more sub-networks (e.g., local area networks (LANs), wide area networks (WANs), or the like). Private network 195 may be associated with a particular organization (e.g., a corporation, financial institution, educational institution, governmental institution, or the like) and may interconnect one or more computing devices associated with the organization. For example, predictive maintenance computing platform 110, digital computing platform 120, and diagnostic distributed database 130 may be associated with an organization (e.g., a financial institution), and private network 195 may be associated with and/or operated by the organization, and may include one or more networks (e.g., LANs, WANs, virtual private networks (VPNs), or the like) that interconnect predictive maintenance computing platform 110, digital computing platform 120, and diagnostic distributed database 130 and one or more other computing devices and/or computer systems that are used by, operated by, and/or otherwise associated with the organization. Public network 190 may connect private network 195 and/or one or more computing devices connected thereto (e.g., predictive maintenance computing platform 110, digital computing platform 120, and diagnostic distributed database 130) with one or more networks and/or computing devices that are not associated with the organization. For example, client computing device 160, client computing device 170, and client computing device 180 might not be associated with an organization that operates private network 195 (e.g., because client computing device 160, client computing device 170, and client computing device 180 may be owned, operated, and/or serviced by one or more entities different from the organization that operates private network 195, such as one or more customers of the organization and/or vendors of the organization, rather than being owned and/or operated by the organization itself or an employee or affiliate of the organization), and public network 190 may include one or more networks (e.g., the internet) that connect client computing device 160, client computing device 170, and client computing device 180 to private network 195 and/or one or more computing devices connected thereto (e.g., predictive maintenance computing platform 110, digital computing platform 120, and diagnostic distributed database 130).

Referring to FIG. 1B, predictive maintenance computing platform 110 may include one or more processors 111, memory 112, and communication interface 117. A data bus may interconnect processor(s) 111, memory 112, and communication interface 117. Communication interface 117 may be a network interface configured to support communication between predictive maintenance computing platform 110 and one or more networks (e.g., private network 195, public network 190, or the like). Memory 112 may include one or more program modules having instructions that when executed by processor(s) 111 cause predictive maintenance computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of predictive maintenance computing platform 110 and/or by different computing devices that may form and/or otherwise make up predictive maintenance computing platform 110. For example, memory 112 may have, store, and/or include an interface module 113, an analysis module 114, an investigation module 115, and a mitigation module 116. Interface module 113 may have instructions that direct and/or cause predictive maintenance computing platform 110 to interface with one or more other devices to receive maintenance or troubleshooting actions performed by the other devices, as well as current or historical states of the one or more other devices, and/or to perform other functions, as discussed in greater detail below. Analysis module 114 may have instructions that direct and/or cause predictive maintenance computing platform 110 to analyze (e.g., via smart-data analysis, machine learning, neural networks, regression analysis, network regression analysis) the maintenance or troubleshooting actions, as well as the current or historical states of the one or more other devices, to determine success of the various maintenance or troubleshooting actions, and/or to perform other functions, as discussed in greater detail below. Investigation module 115 may have instructions that direct and/or cause predictive maintenance computing platform 110 to investigate a problem being experienced by one or more other devices, such as by investigating one or more maintenance or troubleshooting steps performed in the past that successfully solved one or more problems experienced by one or more other devices, and then to identify one or more of the maintenance or troubleshooting steps to recommend for trying to solve the problem currently being experienced by the one or more other devices, and/or to perform other functions, as discussed in greater detail below. Mitigation module 116 may have instructions that direct and/or cause predictive maintenance computing platform 110 to mitigate the problem being experienced by the one or more other devices, such as by using the identified recommended maintenance or troubleshooting steps that successfully solved similar problems in the past for one or more other devices, and/or to perform other functions, as discussed in greater detail below.

Referring to FIGS. 1A and 1B, one or more functions performed by computing environment 100 may relate to various systems and techniques that provide effective, efficient, scalable, and convenient ways of identifying, processing, and recalling processes used for identifying and solving problems with digital systems.

In accordance with one or more embodiments, a predictive maintenance computing platform having at least one processor, a memory, and a communication interface may receive one or more maintenance action reports. For example, the predictive maintenance computing platform may receive two maintenance action reports. Each maintenance action report could include an identified problem with a digital system, such as a memory dump. The maintenance action report could include one or more maintenance actions that a user took in attempting to resolve the identified problem with the digital system. The predictive maintenance computing platform may receive one or more other inputs, such as voice or other audio recordings, mobile device location and/or proximity information, digital system login information, profile location access information, or the like.

The predictive maintenance computing platform may request and receive one or more history logs from the digital system, one or more action logs from the digital system, and/or one or more status reports from the digital system. The digital system may provide such information, which may include one or more indicators of a current health of the digital system. In one or more embodiments, the predictive maintenance computing platform may generate a request that includes information identifying the identified problem with the digital system, and receive a tailored report that includes information regarding whether the identified problem with the digital system has been resolved. The information regarding whether the identified problem with the digital system has been resolved may include identification of one or more actions that occurred within a threshold period of time before the identified problem with the digital system was solved.

The predictive maintenance computing platform may identify a time that the actions that resolved the identified problem with the digital system occurred.

The predictive maintenance computing platform may perform one or more analyses of the maintenance action reports to determine whether the maintenance actions were successful in resolving one or more identified problems with the digital system. For example, the predictive maintenance computing platform may perform a regression analysis of the maintenance action reports to identify one or more solutions to the one or more identified problems with the digital system.

The predictive maintenance computing platform may store one or more identified successful solutions to the one or more identified problems with the digital system in a distributed database. For example, a blockchain may be a distributed database that stores the successful solutions to the one or more identified problems with the digital system. The distributed database may include each interaction (e.g., as identified by the received maintenance action reports). The distributed database may include, with each interaction, an indicator as to whether that interaction is part of a chain of successful solutions to the one or more identified problems with the digital system. The distributed database may therefore include a record of each attempted maintenance action, as well as an indicator for each attempted maintenance action as to whether or not that attempted maintenance action is part of a chain of successful solutions to the one or more identified problems with the digital system.

The distributed database may be a public distributed database, a private distributed database, or a hybrid public-private database that is not fully public, but still includes contributions from a plurality of different sources.

The distributed database may be used to assist the predictive maintenance computing platform in identifying one or more solutions that have worked in the past for a current problem being experienced by a digital system. For example, if the digital system experiences a current problem, the predictive maintenance computing platform may analyze the distributed database to identify one or more maintenance actions that in the past were used to successfully solve a problem similar to the current problem being experienced by the digital system. If the predictive maintenance computing platform successfully identifies one or more maintenance actions that in the past were used to successfully solve the problem similar to the current problem being experienced by the digital system, the predictive maintenance computing platform may generate a report, a recommendation, an alert, or the like, which may include an identification of the one or more maintenance actions that in the past were used to successfully solve the problem similar to the current problem being experienced by the digital system. In one or more embodiments, the predictive maintenance computing platform may automatically initiate one or more maintenance actions corresponding to the one or more maintenance actions that in the past were used to successfully solve the problem similar to the current problem being experienced by the digital system. Thus, in one or more instances, the predictive maintenance computing platform may automatically resolve the current problem being experienced by the digital system, based on replicating the one or more maintenance actions that in the past were used to successfully solve the problem similar to the current problem being experienced by the digital system.

FIGS. 2A-3F depict an illustrative event sequence for using distributed databases for network regression analysis in accordance with one or more example embodiments. The steps of FIGS. 2A-3F may be added to, omitted, performed multiple times, performed in the depicted order, or performed in a different order. For example, one or more of the steps depicted in FIGS. 3A-3F may be performed in conjunction with, in place of, in between, before, or after one or more of the steps depicted in FIGS. 2A-2B.

Figure 2A:
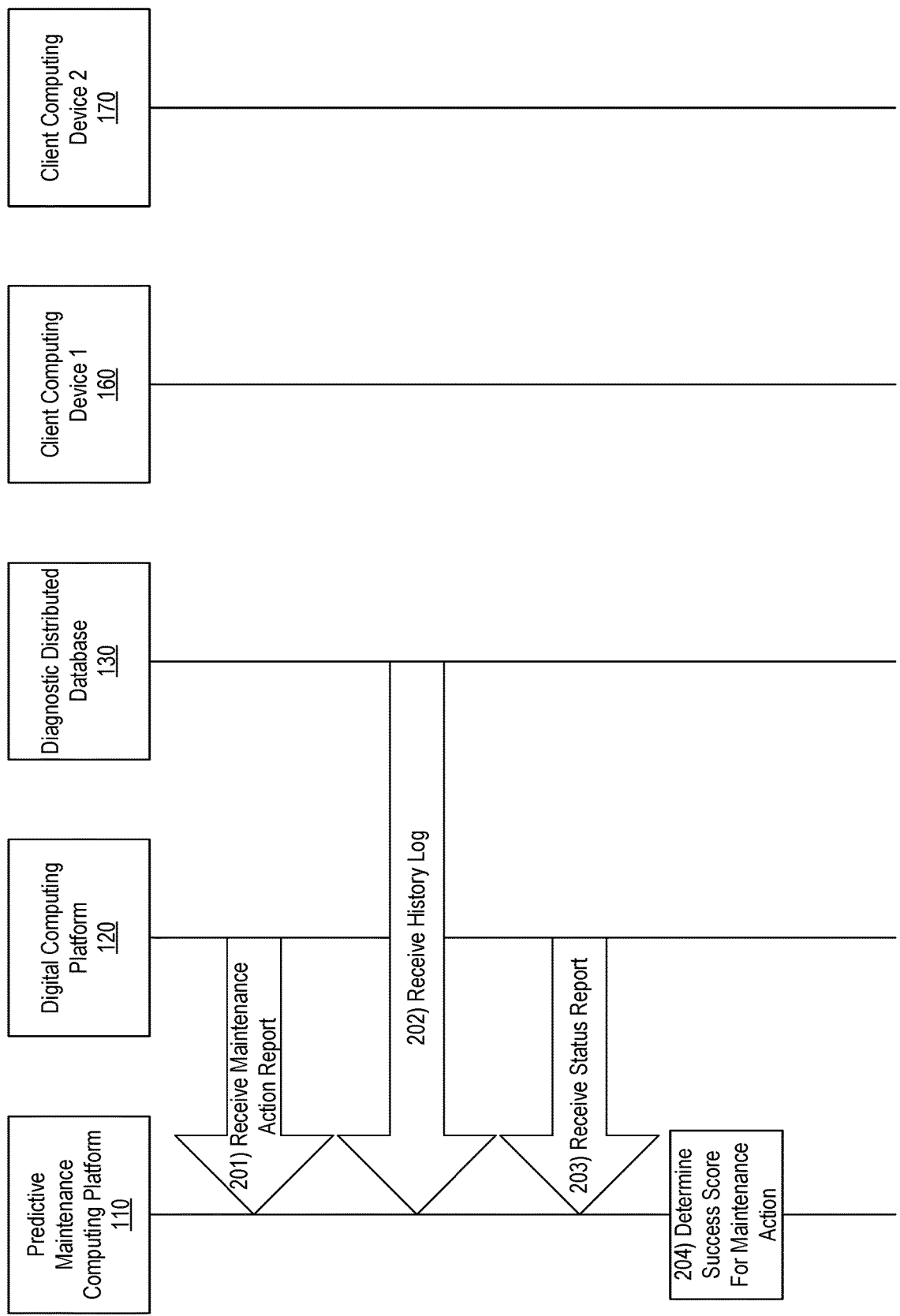
FIGS. 2A-3F depict illustrative event flow diagrams for using distributed databases for network regression analysis in accordance with one or more example embodiments.

Referring to FIG. 2A, at step 201, predictive maintenance computing platform 110 may receive a maintenance action report associated with a maintenance action performed on a first computing platform. A maintenance action report may include information regarding one or more troubleshooting steps taken to resolve a problem.

For example, the maintenance action report may include captured logs, captured data, problem solutions, production tests, or the like. The maintenance action report may include an audit trail that captured records of system changes as they were applied. The maintenance action report may include information that may allow a system to go back and revisit a solution process to see if there was something that could done better and how it could be improved. Because the maintenance action report may be automatically generated based on tracking user inputs and actions, the maintenance action report may include one or more steps that might otherwise have been missed by a user trying to recollect what steps the user took in troubleshooting a problem. The maintenance action report may be generated by an agent or background process that automatically follows the user's actions, collecting evidence of what troubleshooting steps the user took as the user worked through a problem. For example, if the user enters a command to a command prompt, the entered command may be considered a maintenance action. As another example, if the user alters one or more lines of code in a program, the alterations to the lines of code may be considered a maintenance action. A maintenance action report may include one or more maintenance actions.

At step 202, predictive maintenance computing platform 110 may receive a history log associated with at least one historical maintenance action performed on the first computing platform. For example, predictive maintenance computing platform 110 may receive, from a distributed database (e.g., diagnostic distributed database 130), the history log associated with the at least one historical maintenance action performed on the first computing platform. The history log may indicate, for example, one or historical problems that the first computing platform was experiencing, along with one or more time stamps (e.g., problem start time stamp, problem stopped time stamp) associated with those problems. The history log may indicate, as another example, one or more maintenance actions taken, along with one or more time stamps (e.g., maintenance action time stamp) associated with those maintenance actions.

At step 203, predictive maintenance computing platform 110 may receive a status report of a current operating status of the first computing platform. The status report may indicate, for example, whether the first computing platform is currently experiencing a problem. For example, a problem may be that a program experienced a memory dump. The status report may include information about the problem, such as an identification of the problem.

At step 204, predictive maintenance computing platform 110 may determine, based on the status report of the current operating status of the first computing platform, a success score for the maintenance action performed on the first computing platform. For example, if based on the current operating status of the first computing platform, predictive maintenance computing platform 110 determines that the first computing platform is not experiencing a problem that the first computing platform was experiencing before one or more maintenance actions taken and reported in the maintenance report, predictive maintenance computing platform 110 may determine that the one or more maintenance actions taken were successful in resolving the problem previously being experienced by the first computing platform. In determining a success score, the success score may be binary (e.g., successful or unsuccessful), or the success score may be nonbinary (e.g., a range of success from 0-100). For example, if a problem is that a system is running slowly, and troubleshooting steps slightly improve a run speed of the system, but do not fully resolve the slowness of the system, the troubleshooting steps might be scored above a minimum score (e.g., 0), but below a maximum score (e.g., 100).

Figure 2B:
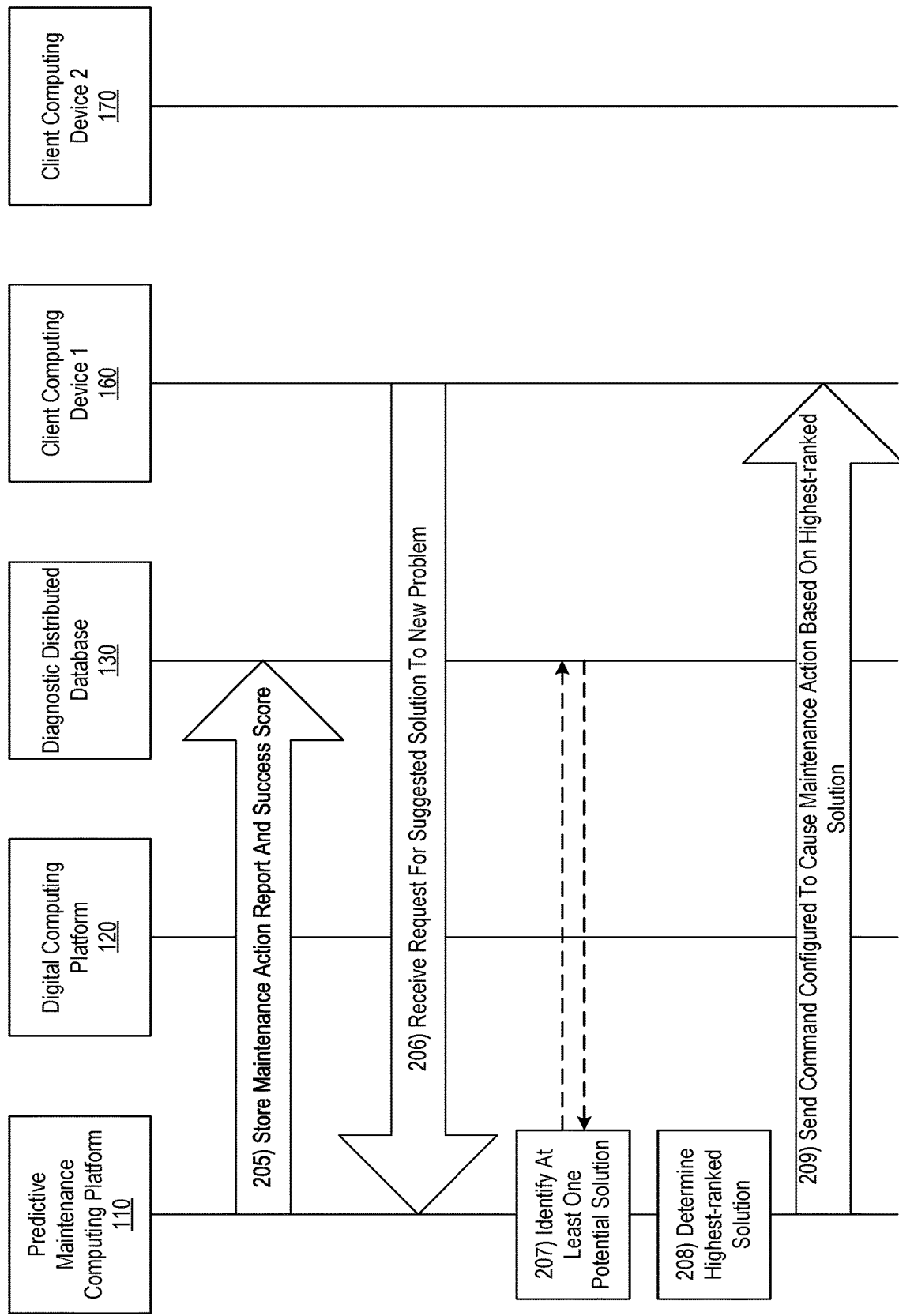

Referring to FIG. 2B, at step 205, predictive maintenance computing platform 110 may store, in the history log associated with the at least one historical maintenance action performed on the first computing platform: the maintenance action report associated with the maintenance action performed on the first computing platform, and/or the success score for the maintenance action performed on the first computing platform. The history log may be stored in or as a distributed database (e.g., diagnostic distributed database 130).

The entry in the history log may include both a description of the maintenance action performed, as well as the success score for the maintenance action performed. Alternatively, there might be separate entries in the history log for the description of the maintenance action performed and the success score for the maintenance action performed. If there are separate entries, one or more entries may include a pointer or other reference to another of the one or more entries to indicate that the one or more entries are associated with each other (e.g., one entry might be for the maintenance action performed, and another entry might be for a success score associated with the maintenance action performed).

The history log or one or more entries of the history log may be stored in or by a log aggregator. The log aggregator may include a parser that may parse the data in the history log (e.g., to identify keywords). For example, if a problem is related to JAVA, the parser may scan for words such as JVM, JAVA, or JDK. The parsing process steps may be identified, tracked, logged, and stored as part of a distributed database.

At step 206, predictive maintenance computing platform 110 may receive a request for a suggested solution to a new problem with a second computing platform that is different from the first computing platform. This request may be from a same computing device as has previously experienced a problem and/or reported a solution, or from a different computing device. The request may include a problem description. The request may include one or more maintenance or troubleshooting steps already attempted.

At step 207, predictive maintenance computing platform 110 may identify, from the history log associated with the first computing platform, at least one potential solution associated with the new problem with the second computing platform. Predictive maintenance computing platform 110 may traverse a distributed database (e.g., diagnostic distributed database 130), such as a blockchain, to identify a solution or solution chain, based on one or more previous actions taken to resolve a similar problem. Predictive maintenance computing platform 110 may use smart data, regression analysis, machine learning, network regression analysis, or other computer intelligence tools to analyze one or more troubleshooting steps or maintenance actions. Predictive maintenance computing platform 110 may filter irrelevant steps, as well as steps that are part of an unsuccessful chain of troubleshooting. For example, if a user changed a portion of code while attempting to resolve a problem, but the changes to the code did not solve the problem, predictive maintenance computing platform 110 may recognize that the changes to the code did not solve the problem, and may filter those unsuccessful troubleshooting attempts from an eventual suggested solution.

At step 208, predictive maintenance computing platform 110 may determine, from among the at least one potential solution associated with the new problem with the second computing platform, a highest-ranked solution of the at least one potential solution associated with the new problem with the second computing platform. Predictive maintenance computing platform 100 may determine more than one high-ranking suggested solution (e.g., if more than one solution scores above a threshold success score). By filtering the potential solutions to focus just on the top scores, unsuccessful or ineffective troubleshooting steps may be avoided. This may help a system or user to more quickly resolve a problem, and return the system to an improved state more quickly.

At step 209, predictive maintenance computing platform 110 may send, in response to the request for the suggested solution to the new problem with the second computing platform, a command configured to cause a maintenance action to be performed on the second computing platform, the maintenance action based on the highest-ranked solution of the at least one potential solution associated with the new problem with the second computing platform.

Referring to FIG. 3A, at step 210, predictive maintenance computing platform 110 may receive a maintenance action report associated with a maintenance action performed on the second computing platform, the maintenance action based on the command configured to cause the maintenance action to be performed on the second computing platform, the maintenance action performed on the second computing platform associated with the highest-ranked solution of the at least one potential solution associated with the new problem with the second computing platform. At step 211, predictive maintenance computing platform 110 may receive a status report of a current operating status of the second computing platform. At step 212, predictive maintenance computing platform 110 may determine, based on the status report of the current operating status of the second computing platform, a success score for the maintenance action performed on the second computing platform. At step 213, predictive maintenance computing platform 110 may store, in a history log associated with at least one historical maintenance action performed on the second computing platform: the maintenance action report associated with the maintenance action performed on the second computing platform, and/or the success score for the maintenance action performed on the second computing platform.

Figure 3B:
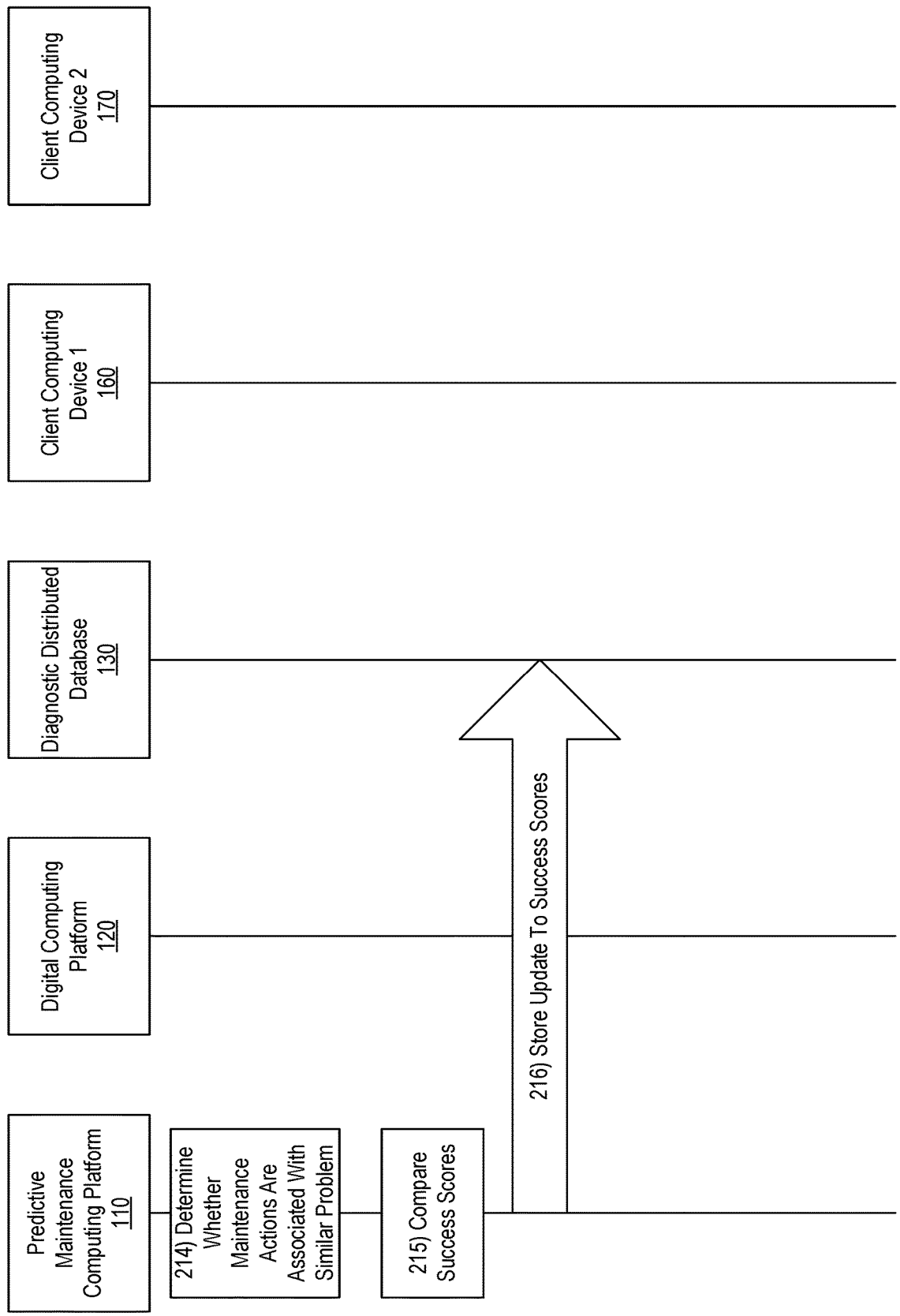

Referring to FIG. 3B, at step 214, predictive maintenance computing platform 110 may determine whether the maintenance action performed on the first computing platform and the maintenance action performed on the second computing platform are both associated with a similar potential problem. At step 215, predictive maintenance computing platform 110 may, in a case that the maintenance action performed on the first computing platform and the maintenance action performed on the second computing platform are both associated with a similar potential problem, compare the success score for the maintenance action performed on the first computing platform and the success score for the maintenance action performed on the second computing platform. At step 216, predictive maintenance computing platform 110 may store an update to at least one of the success score for the maintenance action performed on the first computing platform and the success score for the maintenance action performed on the second computing platform, the update based on comparing the success score for the maintenance action performed on the first computing platform and the success score for the maintenance action performed on the second computing platform. For example, predictive maintenance computing platform 110 may store, in a distributed database, the update to the at least one of the success score for the maintenance action performed on the first computing platform and the success score for the maintenance action performed on the second computing platform.

Referring to FIG. 3C, at step 217, predictive maintenance computing platform 110 may determine, from the history log associated with the at least one historical maintenance action performed on the first computing platform, a number of successful times the maintenance action performed on the first computing platform solved a same problem with the first computing platform. At step 218, predictive maintenance computing platform 110 may use the determined number of successful times the maintenance action performed on the first computing platform solved the same problem with the first computing platform as part of determining the success score for the maintenance action performed on the first computing platform. At step 219, predictive maintenance computing platform 110 may store the success score for the maintenance action performed on the first computing platform (e.g., in a distributed database, such as diagnostic distributed database 130).

At step 220, predictive maintenance computing platform 110 may generate, for display, a user interface screen that comprises the number of successful times the maintenance action performed on the first computing platform solved the same problem with the first computing platform. At step 221, predictive maintenance computing platform 110 may generate, for display, a user interface screen that comprises the highest-ranked solution of the at least one potential solution associated with the new problem with the second computing platform.

Referring to FIG. 3D, at step 222, predictive maintenance computing platform 110 may determine, based on at least one parameter, the success score for the maintenance action performed on the first computing platform. At step 223, predictive maintenance computing platform 110 may store the success score for the maintenance action performed on the first computing device determined based on the at least one parameter, such as storing the success score in diagnostic distributed database 130.

At step 224, predictive maintenance computing platform 110 may apply a respective weighting to a respective success score associated with each of the at least one potential solution associated with the new problem with the second computing platform, as part of determining, from among the at least one potential solution associated with the new problem with the second computing platform, the highest-ranked solution of the at least one potential solution associated with the new problem with the second computing platform. Predictive maintenance computing platform 110 may apply a non-zero weighting to at least one parameter of the success score for the maintenance action performed on the first computing platform if a measure of the at least one parameter of the success score for the maintenance action performed on the first computing platform is above a weighting threshold, and apply a zero weighting to the at least one parameter of the success score for the maintenance action performed on the first computing platform if the measure of the at least one parameter of the success score for the maintenance action performed on the first computing platform is below the weighting threshold.

At step 225, predictive maintenance computing platform 110 may store, in a distributed database (e.g., diagnostic distributed database 130), the history log associated with the at least one historical maintenance action performed on the first computing platform. At step 226, predictive maintenance computing platform 110 may receive, from a distributed database (e.g., diagnostic distributed database 130), the maintenance action report associated with the maintenance action performed on the first computing platform.

Referring to FIG. 3E, at step 227, predictive maintenance computing platform 110 may determine, based on the success score for the maintenance action performed on the first computing platform, whether the maintenance action performed on the first computing platform was a successful solution by determining whether the success score for the maintenance action performed on the first computing platform is above a success threshold.

At step 228, predictive maintenance computing platform 110 may receive a plurality of keystrokes entered by a user as part of performing the maintenance action performed on the first computing platform. At step 229, predictive maintenance computing platform 110 may filter the plurality of keystrokes to remove at least one irrelevant keystroke that is irrelevant to the successful solution. At step 230, predictive maintenance computing platform 110 may store the filtered plurality of keystrokes in a distributed database.

Referring to FIG. 3F, at step 231, predictive maintenance computing platform 110 may receive an updated version of the distributed database. For example, if predictive maintenance computing platform 110 maintains a copy of a blockchain, predictive maintenance computing platform 110 may receive an update to the blockchain. At step 232, predictive maintenance computing platform 110 may send the updated version of the distributed database to a different computing device. For example, if predictive maintenance computing platform 110 maintains a copy of a blockchain, predictive maintenance computing platform 110 may send an update to the blockchain to a different system that maintains a copy of the blockchain.

At step 233, predictive maintenance computing platform 110 may parse the history log associated with the at least one historical maintenance action performed on the first computing platform. At step 234, predictive maintenance computing platform 110 may identify, from parsing the history log associated with the at least one historical maintenance action performed on the first computing platform, a relevant keyword associated with the maintenance action performed on the first computing platform. At step 235, predictive maintenance computing platform 110 may store, in a distributed database with the maintenance action report associated with the maintenance action performed on the first computing platform and the success score for the maintenance action performed on the first computing platform, the relevant keyword associated with the maintenance action performed on the first computing platform.

Figure 4:
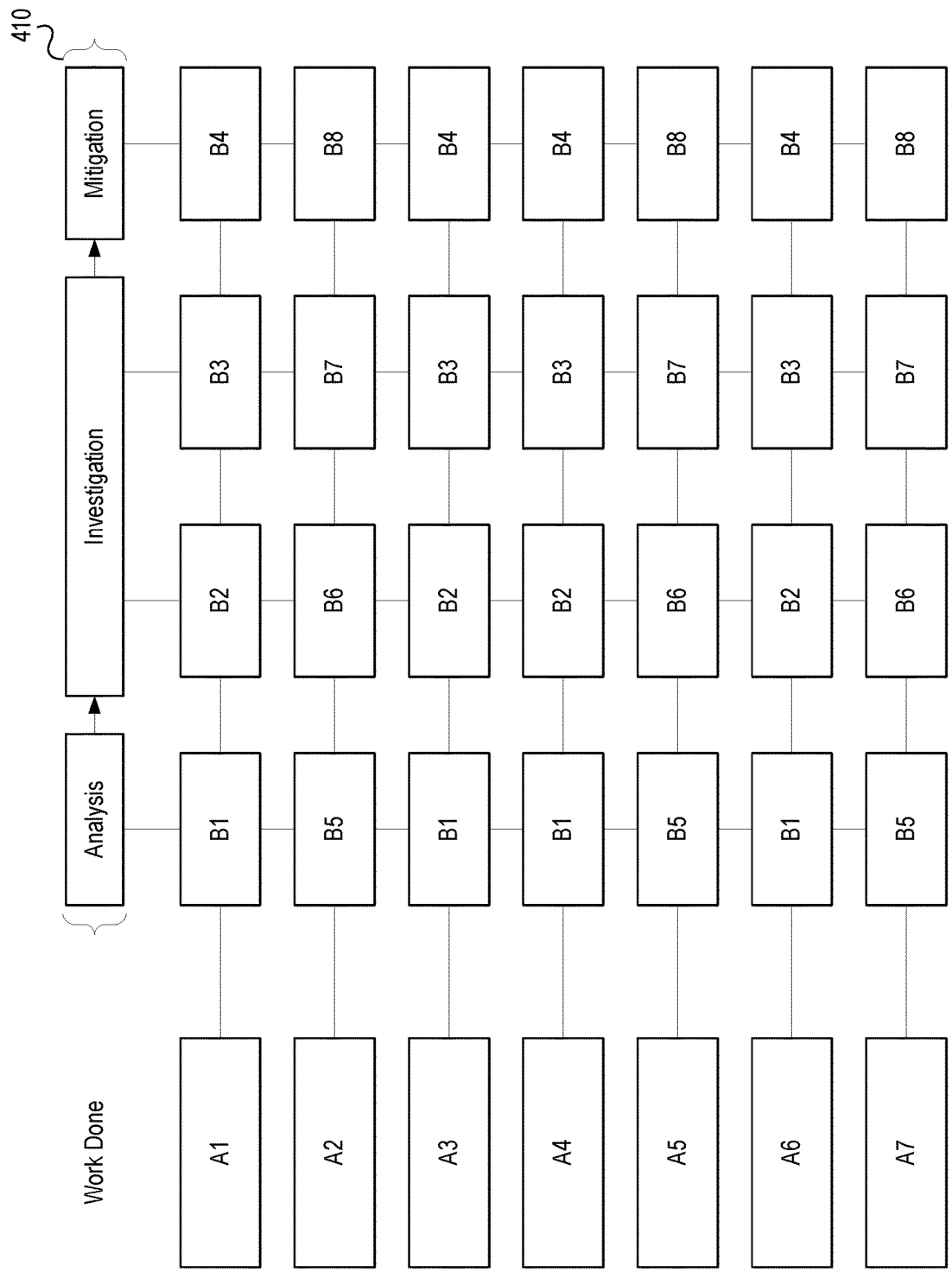
FIG. 4 depicts an example graphical user interface for using distributed databases for network regression analysis in accordance with one or more example embodiments.

FIG. 4 depicts an illustrative block diagram of blockchain-based management of continuous operations. FIG. 4 illustrates a view of continuous operations that may be achieved by using one or more distributed databases (e.g., blockchain) and smart data. Big data may be applied to maintenance real-time data streams. A framework may be provided that can aid in decision making and provide alerts based on predictive technologies using regression analyses. A predictive system network may exist across one or more different branches, both horizontally and vertically. FIG. 4 depicts both a horizontal and vertical view of a high-level analysis of one, two, three, or more phases 410 of troubleshooting, which may include analysis, investigation, and/or mitigation. As these phases are performed, the system may move toward continuous operations, such as through the use of blockchain, smart data, and/or digital intelligence. In one or more systems, an agent on a digital computing platform may track how work (e.g., one or more troubleshooting steps) is done (e.g., in a rudimentary fashion), and send that tracking information to a system that continuously feeds data, such as real-time analytics using smart data level. The system may apply digital intelligence. For example, Level-1 may be a universal way to apply digital intelligence, and may represent a continuous thread and/or network. In another example, blocks B1 and B2, when applied to a blockchain, may provide added value to the data for further analysis and investigation. Thus, a system may introduce a continuous operation that includes continuous analysis, investigation, and mitigation of problems, through application of smart data and distributed databases, such as blockchain.

As depicted in FIG. 4, a multi-tier work stream may be represented. For example, A1-A7 may represent a number of different devices, each of which may be associated with a particular user or team. Each user or team may have an assignment for a project to complete. As a user or team completes its assignment, the completed assignment may be stored in a link to one or more existing work solutions in a distributed database. If the completed assignment is redundant to an existing work solution, the completed assignment might be added as an additional data point to the existing work solution, rather than as a new work solution.

In another example, A1-A7 may represent a number of steps or participants in the completion of a particular project. For example, A1 performs part of the work of the particular project, then A2 performs part of the work of the particular project, then A3 performs part of the work of the particular project, and so on through A7 (or however many steps or participants are involved in completing the project). The blocks B1-B8 may represent how the steps performed by A1-A7 may be interlinked. This information may be related to, for example, how the information is linked to each other, how the tickets are interdependent, or the like. These interdependencies are used in analyzing the steps used to complete a solution to a project (e.g., a solution to a problem).

Figure 5:
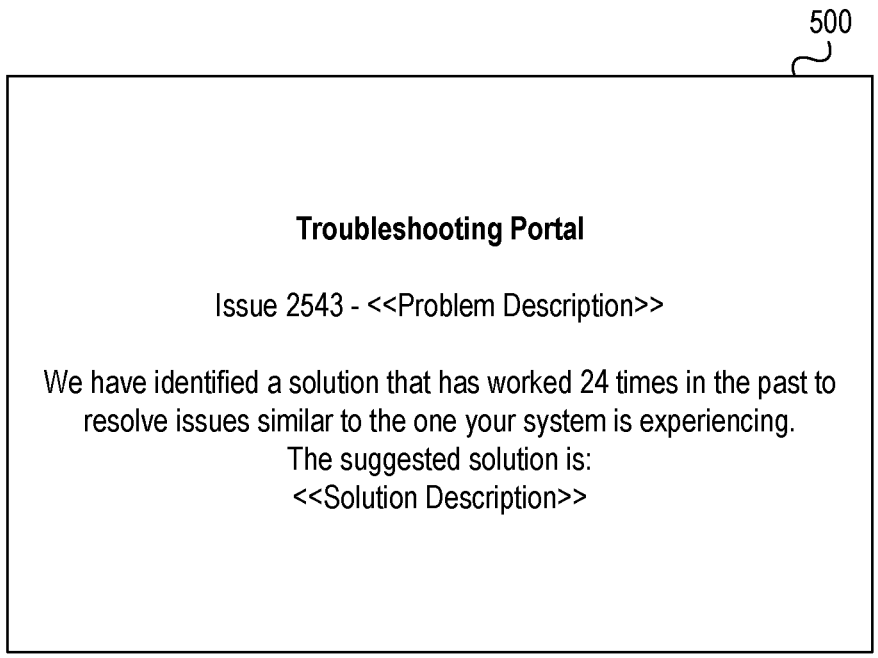
FIG. 5 depicts an example graphical user interface for using distributed databases for network regression analysis in accordance with one or more example embodiments.

Referring to FIG. 5, graphical user interface 500 may be presented by an operating system executing on client computing device 160 and/or by a mobile banking application executing on client computing device 160. Graphical user interface 500 may be displayed when launching a mobile banking application, and/or at another phase of use of the application (e.g., after successful login, in a messages portion of the application, and the like). Graphical user interface 500 may be a part of a troubleshooting portal. Graphical user interface 500 may include information regarding an issue that may be associated with a particular computing platform, including an issue identification number, and a problem description of the issue that may be associated with the particular computing platform. Graphical user interface 500 may include information regarding a suggested solution that has been tried in the past, and that was successful at solving the issue that may be associated with the particular computing platform. Specifically, graphical user interface 500 may include a detailed description of the steps that were involved in the suggested solution that has been tried in the past, and that was successful at solving the issue that may be associated with the particular computing platform. Graphical user interface 500 may include information regarding a number of times that the suggested solution that has been tried in the past, and that was successful at solving the issue that may be associated with the particular computing platform, was successful in the past. In this manner, a user attempting to troubleshoot the issue that may be associated with the computing platform may attempt the suggested solution that has been tried in the past, and that was successful at solving the issue that may be associated with the particular computing platform, and thus may be more efficient at solving the issue that may be associated with the computing platform.

Figure 6:
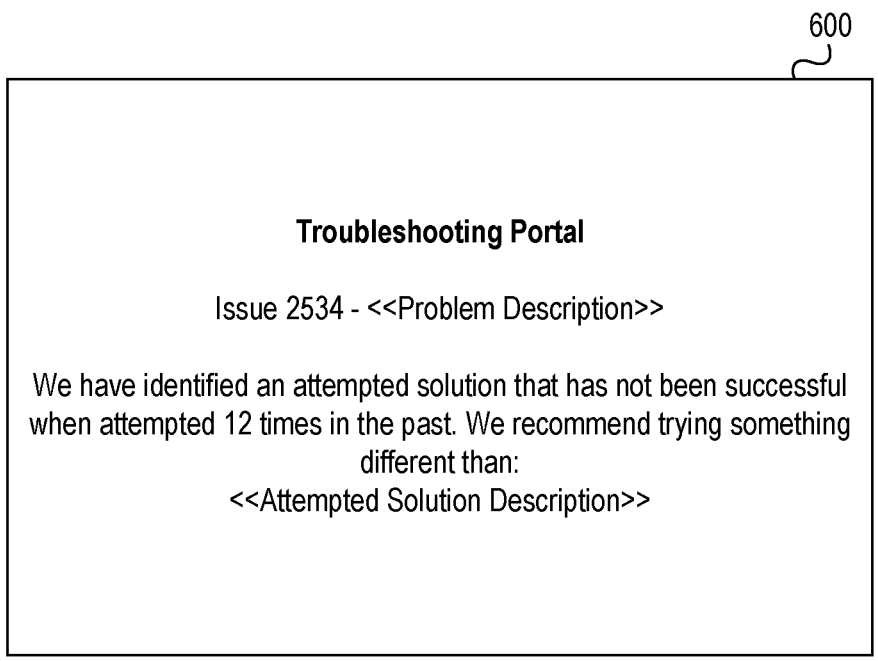
FIG. 6 depicts an illustrative method for using distributed databases for network regression analysis in accordance with one or more example embodiments.

Referring to FIG. 6, graphical user interface 600 may be presented by an operating system executing on client computing device 160 and/or by a mobile banking application executing on client computing device 160. Graphical user interface 600 may include information regarding an issue that may be associated with a particular computing platform, including an issue identification number, and a problem description of the issue that may be associated with the particular computing platform. Graphical user interface 600 may include information regarding an attempted solution that has been tried in the past, but was not successful at solving the issue that may be associated with the particular computing platform. Specifically, graphical user interface 600 may include a detailed description of the steps that were involved in the attempted solution that has been tried in the past, but was not successful at solving the issue that may be associated with the particular computing platform. Graphical user interface 600 may include information regarding a number of times that the attempted solution that has been tried in the past, but that was not successful at solving the issue that may be associated with the particular computing platform, was attempted in the past. In this manner, a user attempting to troubleshoot the issue that may be associated with the computing platform may bypass the attempted solution that has been tried in the past, but that was not successful at solving the issue that may be associated with the particular computing platform, and thus may be more efficient at solving the issue that may be associated with the computing platform.

Figure 7:
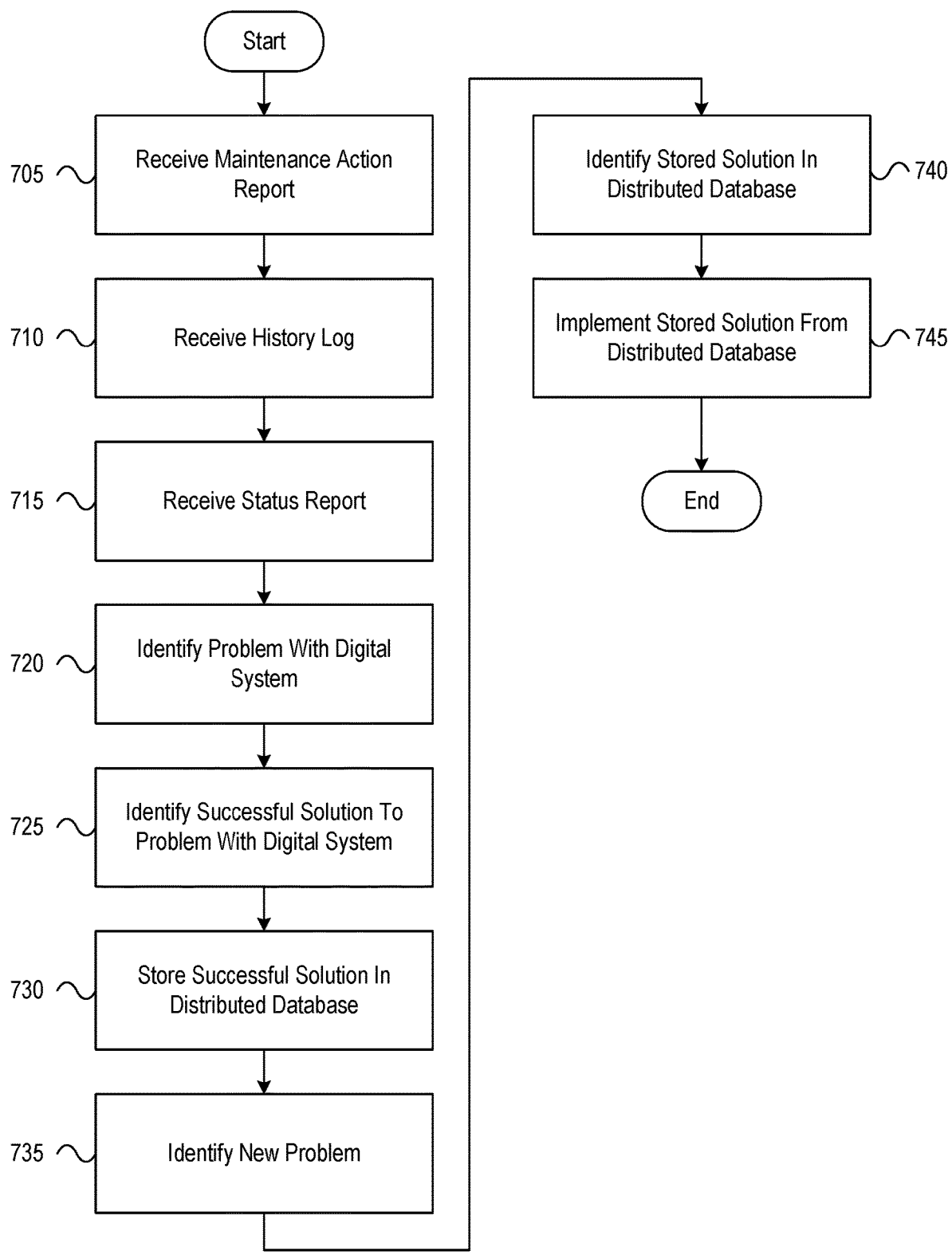

FIG. 7 depicts an illustrative method for using distributed databases for network regression analysis in accordance with one or more example embodiments. Referring to FIG. 7, at step 705, a computing platform having at least one processor, a memory, and a communication interface may receive a maintenance action report. At step 710, the computing platform may receive a history log. At step 715, the computing platform may receive a status report that includes a current status of the digital computing platform. For example, the status report may indicate whether the digital computing platform is experiencing any problems. The computing platform may determine, from the status report, whether a previous problem that the digital computing platform was experiencing has been resolved (e.g., by the maintenance action identified in the maintenance action report). At step 720, the computing platform may identify a problem (e.g., a new problem, a same problem as a past problem) with a digital computing platform (e.g., the digital computing platform, a different computing platform). At step 725, the computing platform may identify a successful solution to the problem with the digital computing platform. At step 730, the computing platform may store the successful solution to the problem with the digital computing platform in a distributed database. At step 735, the computing platform may identify a new problem (e.g., with the digital computing platform or with a different computing platform). At step 740, the computing platform may identify a stored solution to the new problem in the distributed database. At step 745, the computing platform may implement the stored solution from the distributed database. For example, the computing platform may send an alert, a maintenance request, or the like. In another example, the computing platform may automatically implement the stored solution from the distributed database (e.g., by generating a command configured to cause automatic implementation of the stored solution from the distributed database).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive a maintenance action report associated with a maintenance action performed on a first computing platform;
      receive a history log associated with at least one historical maintenance action performed on the first computing platform;
      receive a status report of a current operating status of the first computing platform;
      determine, based on the status report of the current operating status of the first computing platform, a success score for the maintenance action performed on the first computing platform;
      store, in the history log associated with the at least one historical maintenance action performed on the first computing platform:
         the maintenance action report associated with the maintenance action performed on the first computing platform, and
         the success score for the maintenance action performed on the first computing platform;
      receive a request for a suggested solution to a new problem with a second computing platform that is different from the first computing platform;
      identify, from the history log associated with the first computing platform, at least one potential solution associated with the new problem with the second computing platform;
      determine, from among the at least one potential solution associated with the new problem with the second computing platform, a highest-ranked solution of the at least one potential solution associated with the new problem with the second computing platform;
      filter, from the highest-ranked solution of the at least one potential solution associated with the new problem with the second computing platform, first keystrokes corresponding to irrelevant troubleshooting steps of the highest ranked solution or second keystrokes corresponding to troubleshooting steps that are part of an unsuccessful chain of troubleshooting steps of the highest ranked solution; and
      send, in response to the request for the suggested solution to the new problem with the second computing platform, a command configured to cause a maintenance action to be performed on the second computing platform, the maintenance action based on the highest-ranked solution of the at least one potential solution associated with the new problem with the second computing platform.

2. The computing platform of claim 1, wherein the computer-readable instructions, when executed by the at least one processor, cause the computing platform to:
   receive a maintenance action report associated with a maintenance action performed on the second computing platform, the maintenance action based on the command configured to cause the maintenance action to be performed on the second computing platform, the maintenance action performed on the second computing platform associated with the highest-ranked solution of the at least one potential solution associated with the new problem with the second computing platform;
   receive a status report of a current operating status of the second computing platform;
   determine, based on the status report of the current operating status of the second computing platform, a success score for the maintenance action performed on the second computing platform; and
   store, in a history log associated with at least one historical maintenance action performed on the second computing platform:
      the maintenance action report associated with the maintenance action performed on the second computing platform, and
      the success score for the maintenance action performed on the second computing platform.

3. The computing platform of claim 2, wherein the computer-readable instructions, when executed by the at least one processor, cause the computing platform to:
   determine whether the maintenance action performed on the first computing platform and the maintenance action performed on the second computing platform are both associated with a similar potential problem;
   in a case that the maintenance action performed on the first computing platform and the maintenance action performed on the second computing platform are both associated with a similar potential problem, compare the success score for the maintenance action performed on the first computing platform and the success score for the maintenance action performed on the second computing platform; and store an update to at least one of the success score for the maintenance action performed on the first computing platform and the success score for the maintenance action performed on the second computing platform, the update based on comparing the success score for the maintenance action performed on the first computing platform and the success score for the maintenance action performed on the second computing platform.

4. The computing platform of claim 3, wherein the computer-readable instructions, when executed by the at least one processor, cause the computing platform to:

store, in a distributed database, the update to the at least one of the success score for the maintenance action performed on the first computing platform and the success score for the maintenance action performed on the second computing platform.

5. The computing platform of claim 1, wherein the computer-readable instructions, when executed by the at least one processor, cause the computing platform to:

determine, from the history log associated with the at least one historical maintenance action performed on the first computing platform, a number of successful times the maintenance action performed on the first computing platform solved a same problem with the first computing platform; and use the determined number of successful times the maintenance action performed on the first computing platform solved the same problem with the first computing platform as part of determining the success score for the maintenance action performed on the first computing platform.

6. The computing platform of claim 5, wherein the computer-readable instructions, when executed by the at least one processor, cause the computing platform to:

generate, for display, a user interface screen that comprises the number of successful times the maintenance action performed on the first computing platform solved the same problem with the first computing platform.

7. The computing platform of claim 1, wherein the computer-readable instructions, when executed by the at least one processor, cause the computing platform to:

generate, for display, a user interface screen that comprises the highest-ranked solution of the at least one potential solution associated with the new problem with the second computing platform.

8. The computing platform of claim 1, wherein the computer-readable instructions, when executed by the at least one processor, cause the computing platform to:

determine, based on at least one parameter, the success score for the maintenance action performed on the first computing platform.

9. The computing platform of claim 1, wherein the computer-readable instructions, when executed by the at least one processor, cause the computing platform to:

apply a respective weighting to a respective success score associated with each of the at least one potential solution associated with the new problem with the second computing platform, as part of determining, from among the at least one potential solution associated with the new problem with the second computing platform, the highest-ranked solution of the at least one potential solution associated with the new problem with the second computing platform.

10. The computing platform of claim 9, wherein the computer-readable instructions, when executed by the at least one processor, cause the computing platform to:

apply a non-zero weighting to at least one parameter of the success score for the maintenance action performed on the first computing platform if a measure of the at least one parameter of the success score for the maintenance action performed on the first computing platform is above a weighting threshold, and apply a zero weighting to the at least one parameter of the success score for the maintenance action performed on the first computing platform if the measure of the at least one parameter of the success score for the maintenance action performed on the first computing platform is below the weighting threshold.

11. The computing platform of claim 1, wherein the computer-readable instructions, when executed by the at least one processor, cause the computing platform to:

store, in a distributed database, the history log associated with the at least one historical maintenance action performed on the first computing platform.

12. The computing platform of claim 1, wherein the computer-readable instructions, when executed by the at least one processor, cause the computing platform to:

receive, from a distributed database, the maintenance action report associated with the maintenance action performed on the first computing platform.

13. The computing platform of claim 1, wherein the computer-readable instructions, when executed by the at least one processor, cause the computing platform to:

receive, from a distributed database, the history log associated with the at least one historical maintenance action performed on the first computing platform.

14. The computing platform of claim 1, wherein the computer-readable instructions, when executed by the at least one processor, cause the computing platform to:

determine, based on the success score for the maintenance action performed on the first computing platform, whether the maintenance action performed on the first computing platform was a successful solution by determining whether the success score for the maintenance action performed on the first computing platform is above a success threshold.

15. The computing platform of claim 14, wherein the computer-readable instructions, when executed by the at least one processor, cause the computing platform to:

receive a plurality of third keystrokes that were entered by a user as part of performing the maintenance action performed on the first computing platform; and filter the plurality of third keystrokes to remove at least one irrelevant keystroke that is irrelevant to the successful solution.

16. The computing platform of claim 15, wherein the computer-readable instructions, when executed by the at least one processor, cause the computing platform to:

store the filtered plurality of third keystrokes in a distributed database.

17. The computing platform of claim 16, wherein the computer-readable instructions, when executed by the at least one processor, cause the computing platform to:

receive an updated version of the distributed database; and send the updated version of the distributed database to a different computing device.

18. The computing platform of claim 1, wherein the computer-readable instructions, when executed by the at least one processor, cause the computing platform to:
parse the history log associated with the at least one historical maintenance action performed on the first computing platform;
identify, from parsing the history log associated with the at least one historical maintenance action performed on the first computing platform, a relevant keyword associated with the maintenance action performed on the first computing platform; and
store, in a distributed database with the maintenance action report associated with the maintenance action performed on the first computing platform and the success score for the maintenance action performed on the first computing platform, the relevant keyword associated with the maintenance action performed on the first computing platform.

19. A method, comprising:
at a computing platform comprising at least one processor, memory, and a communication interface:
receive a maintenance action report associated with a maintenance action performed on a first computing platform;
receive a history log associated with at least one historical maintenance action performed on the first computing platform;
receive a status report of a current operating status of the first computing platform;
determine, based on the status report of the current operating status of the first computing platform, a success score for the maintenance action performed on the first computing platform;
store, in the history log associated with the at least one historical maintenance action performed on the first computing platform:
the maintenance action report associated with the maintenance action performed on the first computing platform, and
the success score for the maintenance action performed on the first computing platform;
receive a request for a suggested solution to a new problem with a second computing platform that is different from the first computing platform;
identify, from the history log associated with the first computing platform, at least one potential solution associated with the new problem with the second computing platform;
determine, from among the at least one potential solution associated with the new problem with the second computing platform, a highest-ranked solution of the at least one potential solution associated with the new problem with the second computing platform;
filter, from the highest-ranked solution of the at least one potential solution associated with the new problem with the second computing platform, troubleshooting steps that are part of an unsuccessful chain of troubleshooting; and
send, in response to the request for the suggested solution to the new problem with the second computing platform, a command configured to cause a maintenance action to be performed on the second computing platform, the maintenance action based on the highest-ranked solution of the at least one potential solution associated with the new problem with the second computing platform.

20. One or more non-transitory computer-readable media storing instructions that, when executed by a computing platform comprising at least one processor, memory, and a communication interface, cause the computing platform to:
receive a maintenance action report associated with a maintenance action performed on a first computing platform;
receive a history log associated with at least one historical maintenance action performed on the first computing platform;
receive a status report of a current operating status of the first computing platform;
determine, based on the status report of the current operating status of the first computing platform, a success score for the maintenance action performed on the first computing platform;
store, in the history log associated with the at least one historical maintenance action performed on the first computing platform:
the maintenance action report associated with the maintenance action performed on the first computing platform, and
the success score for the maintenance action performed on the first computing platform;
receive a request for a suggested solution to a new problem with a second computing platform that is different from the first computing platform;
identify, from the history log associated with the first computing platform, at least one potential solution associated with the new problem with the second computing platform;
determine, from among the at least one potential solution associated with the new problem with the second computing platform, a highest-ranked solution of the at least one potential solution associated with the new problem with the second computing platform;
filter, from the highest-ranked solution of the at least one potential solution associated with the new problem with the second computing platform, troubleshooting steps that are part of an unsuccessful chain of troubleshooting; and
send, in response to the request for the suggested solution to the new problem with the second computing platform, a command configured to cause a maintenance action to be performed on the second computing platform, the maintenance action based on the highest-ranked solution of the at least one potential solution associated with the new problem with the second computing platform.

* * * * *